United States Patent
Nishikawa et al.

[11] Patent Number: 5,326,641
[45] Date of Patent: Jul. 5, 1994

[54] MAGNETIC RECORDING MEDIUM COMPRISING A FERROMAGNETIC THIN FILM AND A PROTECTIVE LAYER OF FLUORINE BASED RESIN

[75] Inventors: Yasuo Nishikawa; Toshio Ishida, both of Kanagawa, Japan

[73] Assignee: Fuji Photo Film Co., Ltd., Kanagawa, Japan

[21] Appl. No.: 112,066

[22] Filed: Aug. 26, 1993

Related U.S. Application Data

[63] Continuation of Ser. No. 736,332, Jul. 26, 1991, abandoned.

[30] Foreign Application Priority Data

Jul. 27, 1990 [JP] Japan ................... 2-197609

[51] Int. Cl.$^5$ ................................ G11B 5/00
[52] U.S. Cl. .................. 428/421; 428/694 TF; 428/900
[58] Field of Search ............. 428/694 TF, 522, 520, 428/900, 421; 525/235, 247; 204/192.16; 427/131

[56] References Cited

U.S. PATENT DOCUMENTS

| | | | |
|---|---|---|---|
| 4,188,434 | 12/1980 | Loran | 428/65 |
| 4,711,809 | 12/1987 | Nishikawa et al. | 428/336 |
| 4,713,287 | 12/1987 | Nishikawa et al. | 428/326 |
| 4,754,009 | 6/1988 | Squire | 526/247 |
| 4,816,334 | 3/1989 | Yokoyama et al. | 428/336 |
| 4,824,724 | 4/1989 | Ueda et al. | 428/336 |

Primary Examiner—Stevan A. Resan
Attorney, Agent, or Firm—Sughrue, Mion, Zinn, Macpeak & Seas

[57] ABSTRACT

A magnetic recording medium is disclosed, comprising a non-magnetic support having provided thereon a magnetic layer comprising a ferromagnetic metal thin film, wherein a protective layer made mainly of a fluorine-based resin represented by formula (I):

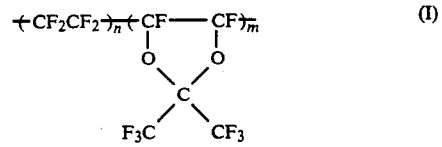

wherein m is an integer of 1 or more, and n is an integer of 10 or more, is provided on the ferromagnetic metal thin film.

8 Claims, No Drawings

MAGNETIC RECORDING MEDIUM COMPRISING A FERROMAGNETIC THIN FILM AND A PROTECTIVE LAYER OF FLUORINE BASED RESIN

This is a Rule 60 continuation of application Ser. No. 07/736,332 filed Jul. 26, 1991 now abandoned.

FIELD OF THE INVENTION

The present invention relates to a magnetic recording medium having a ferromagnetic metal thin film magnetic layer. More particularly, it is concerned with a metal thin film-type magnetic recording medium exhibiting excellent running properties and durability under wide humidity range conditions.

BACKGROUND OF THE INVENTION

Heretofore, a widely used magnetic recording medium type involved coated type media prepared by coating a non-magnetic support with a an organic polymer binder in which a ferromagnetic powder as magnetic material is dispersed, and then drying the magnetic coating composition. In recent years, with an increasing demand for high density recording, so-called metal thin film-type magnetic recording media, in which a ferromagnetic metal thin film as a magnetic layer is formed by a vapor deposition method such as vacuum deposition, sputtering or ion plating, or a plating method such as electric plating or electroless plating, have been receiving attention because their electromagnetic characteristics can be greatly increased.

Theoretical and practical requirements for magnetic recording media for high density recording include high coercive force and low film thickness. Further, metal thin film-type magnetic recording media can be easily decreased in thickness by an order of magnitude as compared with coating type magnetic recording media and are high in saturated magnetic flux density.

In particular, metal thin film formation by the vacuum deposition method provides great advantages because it does not need waste treatment as required in plating method, and its process is straightforward and a rate of deposition can be controllably increased. As a method of forming a magnetic layer having desirably high coercive force and squareness ratio by means of vacuum deposition, an oblique deposition method is known as described in, for example, U.S. Pat. Nos. 3,342,632 and 3,342,633.

However, problems associated with magnetic recording media having a ferromagnetic metal thin film include weather resistance, running properties and durability. Also, problems stem from the fact that the magnetic recording medium is brought into high speed relative movement with a magnetic head in the course of recording, reproduction or erasing of magnetic signals. Under such operating conditions, running should be carried out both smoothly and in a stabilized manner, and at the same time, inadvertent contact with the head, abrasion or breakage should be avoided. Under such circumstances, and in order to increase running properties and durability, the provision of a lubricant layer or a protective layer on the ferromagnetic metal thin film has been studied.

For example, one known protective layer is prepared by dissolving a thermoplastic resin, a thermo-setting resin, fatty acid, a metal salt of fatty acid, fatty acid ester, or alkyl phosphate perfluoropolyether-based compound, and then coating the resulting solution upon the metal thin film.

In addition, it has recently been developed to increase durability by using protective coating compounds having a branched perfluoroalkenyl group (JP-A-61-107528 (the therm "JP-A" as used herein means an "unexamined published Japanese patent application").

However, the metal thin film-type magnetic recording medium prepared according to the above conventional practice fails to exhibit sufficiently satisfactory running properties under wide humidity range conditions ranging from low humidity to high humidity. In addition, its durability is nonoptimal particularly in a low humidity region.

Further, increasing the thickness of the protective layer or the lubricant layer is accompanied by reduction of electromagnetic characteristics due to loss of spacing between the head and the tape.

Accordingly, the industry has awaited more improvements in metal thin film-type magnetic recording media which overcome the above-mentioned drawbacks of the conventional arrangements.

SUMMARY OF THE INVENTION

The objective of the present invention is to overcome the aforementioned problems encountered in the prior art. The main object of the present invention is to provide a metal thin film-type magnetic recording medium which exhibits excellent running properties and durability over a wide range of humidity conditions.

The present invention relates to a magnetic recording medium comprising a non-magnetic support having provided thereon a magnetic layer comprising a ferromagnetic metal thin film, wherein a protective layer mainly comprising a fluorine-based resin represented by formula (I) as shown below is provided on the ferromagnetic metal thin film.

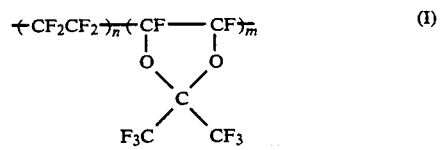

wherein m is an integer of 1 or more and preferably 20 to 500 and n is an integer of 10 or more and preferably 50 to 1,000.

DETAILED DESCRIPTION OF THE INVENTION

The fluorine-based resin of the present invention as represented by formula (I) comprises, in place of a repeating unit of $CF_2CF_2$ of the conventional fluorine-based resin as described in U.S. Pat. No. 4,431,702, the depicted repeating unit segment represented by the formula:

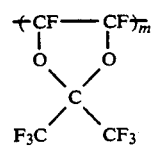

as derived by introduction of a divalent polar group having the formula:

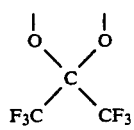

(hereinafter this repeating unit is referred to as a "polar unit") and a repeating unit represented by the formula:

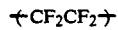

(hereinafter this repeating unit is referred to as a "general unit"). In formula (I), the order of combination of n of the general units and m of the polar units is not critical, and the general and polar units may be either in a block form or in a random form.

The salient feature of the present invention resides in hat the fluorine-based resin of the present invention, having the above specified structure of formula (I), is provided on the surface of the ferromagnetic metal thin film as a protective layer.

Since the fluorine-based resin of the present invention contains the polar groups in the polar units, affinity of the polar groups to the ferromagnetic metal thin film and ultimately the affinity of the fluorine-based resin of the present invention to the ferromagnetic metal thin film are increased by the anchor effect of the polar groups to the ferromagnetic metal thin film. This increase of affinity produces the effect that the above protective layer is more difficult to peel apart from the ferromagnetic metal thin film as compared to conventional protective layers.

Moreover, since the fluorine-based resin of the present invention contains the polar units, it can be easily dissolved in a solvent and, therefore, the present invention has an advantage in that the protective layer can be easily formed on the ferromagnetic metal thin film. By way of comparison, in the case of conventional fluorine-based resins such as polytetrafluoroethylene, since there are no suitable solvents capable of dissolving such resins, it is not easy to provide a protective layer on the surface of the ferromagnetic metal thin film from a practical standpoint.

Moreover, the general units in the fluorine-based resin of the present invention are extremely hydrophobic especially compared with the conventional perfluoropolyether containing oxygen in the repeating unit, and the polar units are more hydrophilic than the general units. Also in the present invention, the general units contribute mainly to the excellent durability and weather resistance under high humidity conditions and the polar units can compensate for the durability under high humidity condition.

Moreover, since the surface energy of the fluorine-based resin of the present invention is small, there is the additional advantage that a lubricant can be provided within the protective layer or in the surface portions thereof, and because of good affinity of the fluorine-based resin to the lubricant, the powerto retain the lubricant in the interior of the protective layer or in the surface thereof, i.e., lubricity, is maintained at a high level.

Although the protective layer may be made of the fluorine-based resin of formula (I) alone,, it may be made of a mixture of the fluorine-based resin of formula (I) as a main component and other known resins as described in, for example U.S. Pat. Nos. 4,880,692, 4,798,775, 4,049,871, 3,597,273, 3,634,137, 3,821,025, 4,068,040, 4,154,895, 4,429,017, 4,409,299, and 4,333,988. Example of known resins to be used with the fluorine-based resin include polyvinylidene chloride, polyvinyl chloride, a vinyl chloride copolymer (e.g., vinyl chloride-vinyl acetate copolymer, vinyl chloride-vinyl acetate-vinyl alcohol copolymer, etc.), and polyurethane.

The present inventors have discovered that by providing the fluorine-based resin of the present invention on the surface of a ferromagnetic metal thin film provided as a magnetic layer on the non-magnetic support that the abrasion resistance of the magnetic recording medium to members such as a magnetic head, a guide and a pole under severe conditions such as low humidity or high humidity is markedly increased and, at the same time, the coefficient of friction of the magnetic recording medium to running unit members is decreased.

The above advantageous effects are even more enhanced by using in combination a fluoropolyether-based lubricant having a fluoropolyether structure with a resin of formula (I). This fluoropolyether-based lubricant may be used in two embodiments: one is such that the fluoropolyether-based lubricant is present in the interior of the protective layer in admixture with the fluorine-based resin of formula (I), and the other embodiment is a laminate structure wherein the fluoropolyether-based lubricant is present on the surface of the protective layer. It is to be noted, however, that the above mixed structure embodiment and laminate structure embodiment are not necessarily mutually exclusive, and they may be both used in combination in the same recording medium.

The object of the present invention is attained by forming the protective layer comprised mainly of the fluorine-based resin represented by formula (I) on the surface of a ferromagnetic metal thin film provided on the non-magnetic support by techniques such as electric plating, sputtering, vacuum deposition and ion plating.

As the fluorine-based resin of the present invention, Teflon AF sold by Dupont Co. and so on are commercially available.

In formula (I), the ratio of n for the general unit to m for the polar unit is generally 5/95 to 80/20 and preferably 10/90 to 60/40. The weight average molecular weight of the formula (I) resin used is 1,500 to 15,000 and preferably 2,000 to 12,000.

Since the fluorine-based resin of the present invention contains the polar groups:

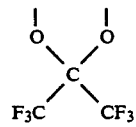

in the polar units, it has suitable polarity and thus is relatively easily soluble in solvents. Thus, the protective layer can be formed on the ferromagnetic metal thin film of the magnetic recording medium of the present invention by coating a solution of the fluorine-based resin of the present invention in a solvent. Therefore, the advantages associated with the present invention are in that the formation of the protective layer can be made relatively straight forward and that characteristics of the medium can be more improved by coating a mixed solution of the fluorine-based resin of formula (I) and other arbitrarily selected components capable of co-existence in the protective layer, and the thickness of the protective layer can be controlled relatively easily.

As discussed above, for conventional fluorine-based resins, there are no solvents capable of dissolving them. Thus, there is no suitable method for applying the conventional fluorine-based resins to the magnetic recording medium. For this reason, a conventional practice involves forming a thin film of polytetrafluoroethylene on the magnetic layer by attaching the polytetrafluoroethylene powder by rubbing. In accordance with this method, however, it is not possible to form a uniform film, and the effects are not sufficiently satisfactory.

In the production of the magnetic recording medium of the present invention, the protective coating made mainly of the fluorine-based resin of formula (I) of the present invention can be formed by the following methods:

(1) a method in which the fluorine-based resin of the present invention is dissolved in a suitable organic solvent such as described hereinafter, coated or sprayed on a substrate and then dried, (2) a method in which the fluorine-based resin is melted and melt-coated on the magnetic layer, (3) a method in which the fluorine-based resin is attached onto the magnetic layer through rubbing, (4) a method in which the fluorine-based resin is dissolved in an organic solvent, and the magnetic recording medium is dipped in the resulting solution to make the fluorine-based resin as absorbed on the surface of the magnetic layer, and (5) a method in which a monomolecular film of the fluorine-based resin is formed on the surface of the magnetic layer by, for example, a Langmuir-Project method.

Solvents which can be used to dissolve the fluorine-based resins of formula (I) of the present invention include perfluoroalkanes, perfluorocycloalkanes, perfluorocycloethers, low molecular weight perfluoropolyethers, and mixtures thereof.

The thickness of the protective layer made mainly of the fluorine-based resin of formula (I) of the present invention is generally 10 to 200 Å and preferably 30 to 100 Å, and the coated amount of the fluorine-based resin of formula (I) is generally 2 to 20 mg/m$^2$ and preferably 5 to 10 mg/m$^2$. The protective layer of the present invention generally contains 30 to 100 wt. % and preferably 60 to 100 wt. % of the fluorine-based resin based on the weight of the protective layer.

If the amount of the fluorine-based resin present is too large, the anchor effect of the polar group in the polar unit does not work sufficiently, and the fluorine-based resin causes head contamination and head clogging. On the other hand, if the amount of the fluorine-based resin present is too small, the protective effect of the fluorine-based resin is weakened, and the object of the present invention cannot be attained.

In the magnetic recording medium of the present invention, in order to increase the adhesion of the protective layer to the ferromagnetic metal thin film, the surface of the ferromagnetic metal thin film can be treated with surfactants such as fatty acid or various coupling agents prior to the provision of the protective layer.

The protective layer may be either a single layer or be made of a plurality of layers.

For formation of the protective layer, additionally, a vacuum deposition method, a method of attaching the powder by rubbing, and so forth can be employed.

In the magnetic recording medium of the present invention, as described above, a general lubricant can be used in the protective layer in admixture with the fluorine-based resin of the present invention, or be laminated on the protective layer. In the former, the general lubricant can be contained in an amount of 2 to 50 wt. % and preferably 5 to 30 wt. % based on the weight of the protective layer. In the latter, the general lubricant can be coated in an amount of 2 to 200 mg/m$^2$ and preferably 5 to 30 mg/m$^2$.

General lubricants which can be used include fluoropolyethers (e.g., fluorinated polyethers and modified fluorinated polyethers), fatty acids, metal soaps, fatty acid amides, fatty acid esters, higher aliphatic alcohols, monoalkyl phospates, dialkyl phosphates, trialkyl phosphates, paraffins, silicone oil, animal and vegetable oils, mineral oils, higher aliphatic amines; inorganic fine powders such as graphite, silica, molybdenum disulfide and tungusten disulfide; resin fine powders such as polyethylene, polypropylene, polyvinyl chloride, an ethylene-vinyl chloride copolymer, and polytetrafluoroethylene; α-olefin polymers; and unsaturated aliphatic hydrocarbons which are liquid at ordinary temperature.

If the fluoropolyether-based lubricants among the above lubricants are used in combination, the durability is increased cumulatively to some extent. The fluoropolyethers may be a homopolymer or copolymer and have a repeating unit of —$(C_aF_bCl_cH_d)$— wherein a is an integer of 1 to 5, b is an integer of 1 or more and c and d each is 0 or an integer of 1 or more, provided than b+c+d is 2a.

Preferred examples of the fluoropolyethers are modified or unmodified perfluoropolyethers having a molecular weight of 1,500 to 15,000.

More specifically, Crytox 143 series (polyfluoropropylene oxide) produced by Dupont Co., Fonbrine Y series (perfluoropropylene oxide-perfluoromethylene oxide copolymers) produced by Montefluos Co., Fonbrine Z series (perfluoroethylene oxide-perfluoromethylene oxide copolymers) produced by Montefluos Co., and the above fluoropolyethers compounds derived by introducing a functional group (e.g., —COOH, —OH, and —CONH$_2$) into one or both ends of the above compounds, and compounds in which a plurality of perfluoropolyether chains are extended from the central atom group can be used.

Of these compounds, the compounds in which a plurality of perfluoroether chains are extended from the central atom group, and which are low in the coefficient of friction and are excellent in durability.

Specific examples of the compounds having such a fluoropolyether structure are shown below.

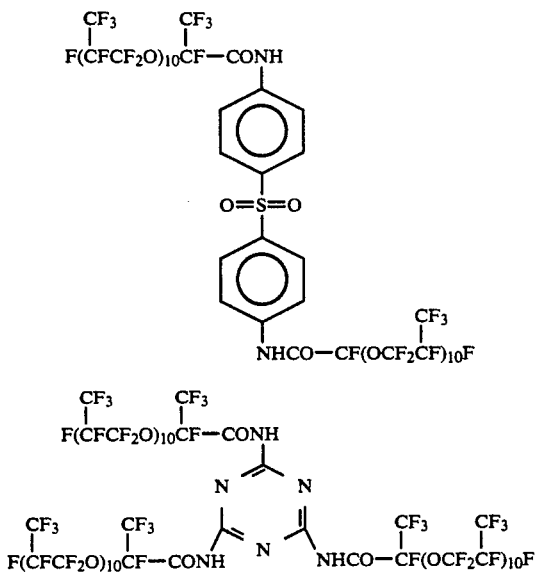

Materials which can be used for the ferromagnetic metal thin film include ferromagnetic metals such as iron, cobalt and nickel; and ferromagnetic alloys such as Fe—Co, Fe—Ni, Co—Ni, Fe—Rh, Co—P, Co—B, Co—Y, Co—La, Co—Ce, Co—Pt, Co—Sm, Co—Mn, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W, and Co—Ni—Re.

This material is provided on the non-magnetic support by a technique such as electric plating, electroless plating, gas phase plating, sputtering, vacuum deposition or ion plating to form the ferromagnetic metal thin film. The thickness of the film, which used as the magnetic recording medium, is 0.02 to 2 μm and preferably 0.5 to 1.0 μm.

The above ferromagnetic metal thin film may also contain, in addition to the above-mentioned materials, any of O, N, Cr, Ga, As, Sr, Zr, Nb, Mo, Rh, Pd, Sn, Sb, Te, Pm, Re, Os, Ir, Au, Hg, Pb, and Bi.

The surface profile of the magnetic layer is not particularly critical. However, in the case where the surface has projections 10 to 1,000 Å in height, the resulting magnetic recording medium is excellent in running properties and durability.

The thickness of the support is preferably 4 to 50 μm. In order to increase the adhesion of the ferromagnetic metal thin film or to improve magnetic characteristics, the support may be provided with a subbing layer. As the subbing layer, for example, a filler-containing resin layer in which fine particles of $SiO_2$ or $CaCO_3$ are uniformly dispersed can be employed.

Supports which can be used in the present invention include plastic bases such as polyethylene terephthalate, polyimide, polyamide, polyvinyl chloride, cellulose triacetate, polycarbonate, polyethylene naphthalate, and polyphenylene sulfide, and Al, Ti, and stainless steel.

In order to increase running durability, it is effective to provide minute projections on the surface of the support prior to formation of the ferromagnetic metal thin film, because this results in formation of suitable replicated irregularities on the surface of the magnetic layer. The density of minute projections on the surface of the support is preferably $2 \times 10^6$ to $2 \times 10^8/mm^2$ and the height of the projection is preferably 1 to 50 nm.

Such minute projections can be provided by conventional methods as described in, for example, U.S. Pat. Nos. 4,839,217, 4,952,449, 4,898,753, 4,138,386, 4,687,700, 3,419,460, 4,761,327, 4,786,558, 4,615,939, and 4,619,869.

The magnetic recording medium of the present invention may be in any desired form, such as tape, sheet, card or disk. Particularly preferred are tape- and disk-like forms.

In the metal thin film-type magnetic recording medium of the present invention, the fluorine-based resin of formula (I) of the present invention, comprising the polar unit containing the polar groups and the general unit having hydrophobicity, is provided on the surface of the magnetic layer as the protective layer. Thus, the magnetic recording medium of the present invention is excellent in peeling resistance and particularly in lubricity under low and high humidity conditions and, therefore, exhibits good durability, running properties and abrasion resistance. In addition, the fluorine-based resin of formula (I) of the present invention is easily soluble in solvents unlike conventional fluorine-based resins and, therefore, produces the effect that the protective layer can be formed with great ease.

The present invention is described in greater detail with reference to the following examples although it is not limited thereto.

EXAMPLE 1

On a 13 μm-thick polyethylene terephthalate film was provided a cobalt-nickel magnetic film (film thickness 150 nm) by oblique vacuum deposition to produce an original material for a magnetic recording medium. As a vapor source, an electron beam vapor source was used. A cobalt-nickel alloy (Co: 80 wt. %, Ni: 20 wt. %) was charged, and the oblique vacuum deposition was performed in a vacuum of $5 \times 10^{-5}$ Torr in such a manner that the incident angle was 50°.

Teflon AF1600 (produced by Dupont Co.), a fluorine-based resin of formula (I) of the present invention, was dissolved in a 1:1 (by weight) mixed solvent of a low molecular weight perfluoropropylene oxide polymer (m.w. 300–400) and perfluorooctane, and the resulting solution was coated on the magnetic metal thin film of the above original material by means of a bar coater in such a manner that the amount of the solution coated was 10 mg/m² to thereby form a protective layer of the fluorine-based resin of the present invention.

After drying of the protective layer, a solution of a lubricant of a perfluoropropylene oxide polymer sold under the trade name of Crytox 143AZ (produced by Dupont Co.) in Freon 113 was coated on the above protective layer by means of a bar coater in an amount of 10 mg/m² to thereby form a lubricant layer.

The thus manufactured material of the magnetic recording medium was then slit to 8 mm width to form a sample of 8 mm video magnetic tape.

EXAMPLE 2

A 8 mm video magnetic tape sample was produced in the same manner as in Example 1 except that the lubricant layer as an uppermost layer was not formed.

EXAMPLE 3

A 8 mm video magnetic tape sample was produced in the same manner as in Example 1 except that the lubricant layer as the uppermost layer was not formed, and that the protective layer containing the fluorine-based resin of formula (I) of the present invention was formed as described below.

Teflon AF2400 (produced by Dupont Co.), a fluorine-based resin of formula (I) the present invention, and Crytox 143AY (produced by Dupont Co.), a lubricant of perfluoropolypropylene oxide, were mixed in a weight ratio of 10:2, and the resulting mixture was dissolved in a 1:1 (by weight) mixed solvent of low molecular weight perfluoropolypropylene oxide and perfluorooctane. The solution thus prepared was coated in an amount of 10 mg/m$^2$ by means of a bar coater to form a protective layer of the fluorine-based resin of the present invention.

Comparative Example 1

A 8 mm video magnetic tape sample was produced in the same manner as in Example 1 except that the lubricant layer was formed by coating the ferromagnetic metal thin film with a solution of perfluoropolypropylene oxide polymer (Crytox 143AY) in Freon 113, in an amount of 10 mg/m$^2$, and no other layers were formed.

The 8 mm video magnetic tapes as obtained above were measured for coefficient of friction to a stainless steel bar under the following two conditions:

Condition A: 25° C., 70% RH,
Condition B: 25° C., 15% RH, and also for still durability on a 8 mm VTR under Conditions C and D as described hereinafter, by the following methods.

Measurement of Coefficient of Friction

The magnetic layer surface of the magnetic tape sample was brought into contact with a stainless steel pole at a tension ($T_1$) and a winding angle of 180°, and a tension ($T_2$) necessary for running the magnetic tape at a rate of 3.3 cm/sec was measured. The coefficient of friction, $\mu$, was calculated from the following equation:

$$\mu = \frac{1}{\pi} l_n (T_2/T_1)$$

Measurement of Still Durability

Still durability was evaluated by measuring a period until, when a pause button was pushed at the time of reproduction of image on a 8 mm video VTR, Model FUJIX-8 M-6 (produced by Fuji Photo Film Co., Ltd.) (provided the function to limit a still reproduction time was removed) under the following conditions:

Condition C: 25° C., 15% RH,
Condition D: 25° C., 5% RH, no image appeared.
The results are shown in Table 1.

TABLE 1

|  | Coefficient of Friction | | Still Durability | |
| --- | --- | --- | --- | --- |
|  | Condition A | Condition B | Condition C | Condition D |
| Example 1 | 0.21 | 0.20 | more than 60 min | 42 min |
| Example 2 | 0.22 | 0.20 | more than 60 min | more than 60 min |
| Example 3 | 0.21 | 0.20 | more than | more than |

TABLE 1-continued

|  | Coefficient of Friction | | Still Durability | |
| --- | --- | --- | --- | --- |
|  | Condition A | Condition B | Condition C | Condition D |
|  |  |  | 60 min | 60 min |
| Com. Ex. 1 | 0.32 | 0.24 | 40 min | 20 min |

From the results of Table 1, it can be seen hat in Examples 1 to 3 in which the fluorine-based resin of formula (I) of the present invention is provided as the protective layer, the coefficient of friction under high and low humidity conditions is low and the still durability is excellent as compared with Comparative Example 1 in which a conventional fluorine-based lubricant is merely provided on the magnetic layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising a ferromagnetic metal thin film, wherein a protective layer mainly comprising a fluorine-based resin represented by formula (I):

$$\mathrm{\{CF_2CF_2\}_n\{CF\!\!-\!\!-\!\!CF\}_m} \quad (I)$$
$$\mathrm{\underset{F_3C\ \ CF_3}{O\diagdown\!\!\diagup O}}$$
$$\mathrm{\underset{}{C}}$$

wherein m is an integer of 1 or more, and n is an integer of 10 or more, is provided on the ferromagnetic metal thin film, wherein said fluorine-based resin has a weight average molecular weight of 1,500 to 15,000.

2. The magnetic recording medium as claimed in claim 1, wherein a lubricant having a fluoropolyether structure is present on said protective layer.

3. The magnetic recording medium as claimed in claim 1, wherein a lubricant having a fluoropolyether structure is contained in said protective layer.

4. The magnetic recording medium as claimed in claim 1, wherein m is an integer of from 20 to 500 and n is an integer of from 50 to 1000.

5. The magnetic recording medium as claimed in claim 1, wherein said fluorine-based resin has a coated amount of 2 to 20 mg/m$^2$.

6. The magnetic recording medium as claimed in claim 1, wherein said protective layer has a single layer structure or a plural layer structure.

7. The magnetic recording medium as claimed in claim 2, wherein said lubricant is selected from the group consisting of a polyfluoropropylene oxide, a perfluoropropylene oxide-perfluoromethylene oxide copolymer and a perfluoroethylene oxide-perfluoromethylene oxide copolymer.

8. The magnetic recording medium as claimed in claim 3, wherein said lubricant is selected from the group consisting of a polyfluoropropylene oxide, a perfluoropropylene oxide-perfluoromethylene oxide copolymer and a perfluoroethylene oxide-perfluoromethylene oxide copolymer.

* * * * *